Figure 1:
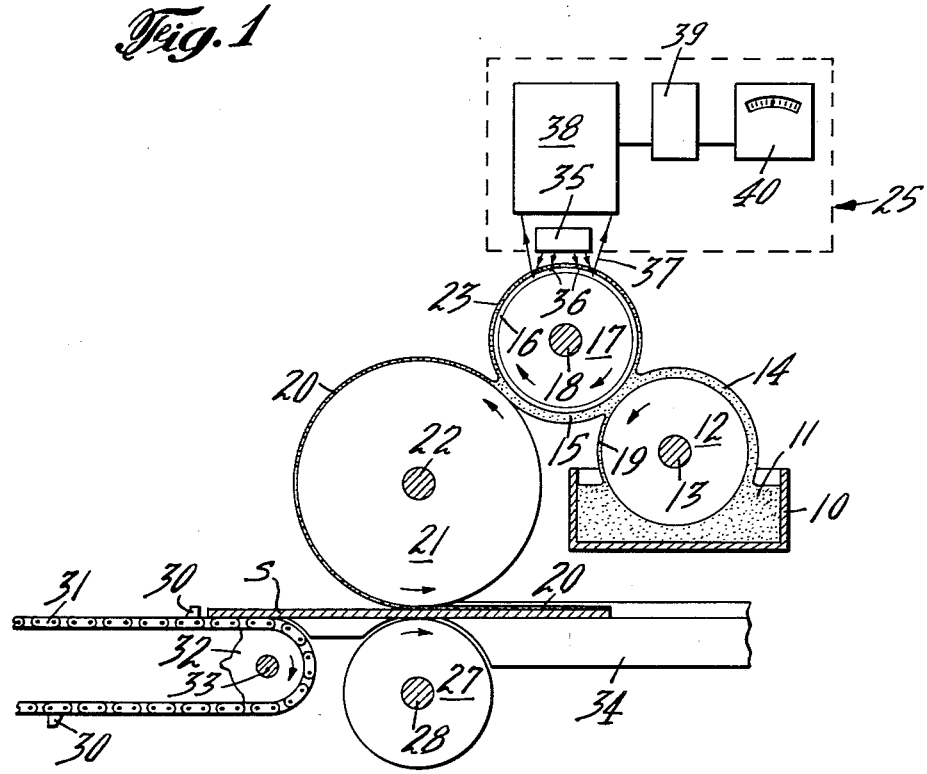

April 21, 1964 W. J. DOBBINS 3,130,303
APPARATUS FOR MEASURING COATING AMOUNTS
Filed Nov. 2, 1960

INVENTOR.
WALTER JAMES DOBBINS
BY Robert P. Auber
George W. Reiber
ATTORNEYS

United States Patent Office 3,130,303
Patented Apr. 21, 1964

3,130,303
APPARATUS FOR MEASURING COATING
AMOUNTS
Walter James Dobbins, Lake Zurich, Ill., assignor to
American Can Company, New York, N.Y., a
corporation of New Jersey
Filed Nov. 2, 1960, Ser. No. 66,801
7 Claims. (Cl. 250—43.5)

The present invention relates to an apparatus for measuring the amount of coating being applied to a substrate, and in particular pertains to the use of atomic radiation directed against a certain portion of a conventional roller coating apparatus to determine coating amounts.

The subject invention is an improvement on the invention disclosed in co-pending application Serial No. 593,-754, filed June 25, 1956, now U.S. Patent No. 3,019,336, issued January 30, 1962, and owned by the assignee of the subject invention. The invention disclosed in the co-pending application is based upon the discovery that the thickness or amount of a wet coating applied to sheet or web by means of a commercial roller coating machine can be determined by measuring the thickness or amount of a film of the coating carried on the peripheral surface of one of the transfer rollers of the coating machine, which measurement is effected by measuring the intensity or quantity of back-scattered beta radiation coming from the transfer roller and wet coating thereon.

Although the invention as disclosed in the co-pending application is valid for specially constructed experimental roller coating machines and for some commercially operated roller coaters, difficulty was experienced when the invention was applied to a number of older, much used roller coaters in factory production. Among these difficulties were the inability to obtain really accurate measurements of coating thickness and/or reproducible measurements over a plurality of commercial runs. While not wishing to be bound by any particular theory, it is believed that these difficulties were the result of worn machines wherein the transfer roller upon which the measurements were taken were out of round; or the existence of magnetic fields in the transfer roller, thus causing the beta response to be erratic.

It is therefore an object of the instant invention to provide an apparatus for measuring the amount of wet coating being applied to a continuous web or sheet of material whereby highly accurate and reproducible measurements can be made time after time.

A further object is to provide an apparatus for accurately measuring the amount of coating being applied to a web or sheet which involves a minimum of change to existing roller coating equipment.

Numerous other objects and advantages of the invention will be apparent as it is better understood from the following description, which, taken in connection with the accompanying drawings, discloses a preferred embodiment thereof.

I have discovered that the above objects can be accomplished by providing the transfer roller upon which the measurements are to be made with a carefully prepared surface of a non-magnetic metal, the thickness of this non-magnetic metal being infinite with respect to beta ray penetration.

Figure 2:
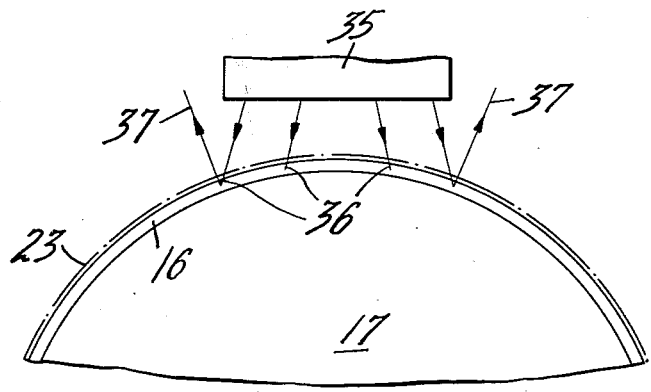

Referring to the drawings:

FIGURE 1 is a schematic side elevational view illustrating the apparatus of the present invention, with portions thereof shown in section; and FIG. 2 is an enlarged schematic view showing a fragment of the transfer roller and the beta source.

As a preferred or exemplary embodiment of the instant invention, FIG. 1 shows a container 10 supported in a suitable manner (not shown) containing a bath or reservoir of liquid coating 11. Partially submerged and rotating in the bath 11 is a steel pick-up roller 12 mounted for counterclockwise rotation on a shaft 13. Carried on the surface of the roller 12 emerging from the bath 11 is a layer or film of coating 14. As the roller 12 rotates, a portion 15 of the coating layer 14 is transferred to a metallic chromium layer 16 constituting the surface of a steel roller 17, which roller is mounted adjacent the roller 12 for rotation in a clockwise direction on a shaft 18. The nature and function of the chromium layer 16 will be described more fully hereinafter. The portion 19 of the coating layer 14 not transferred to the roller 17 is returned to the bath 11.

As the roller 17 rotates, a portion 20 of the coating layer 15 is transferred to a non-metallic, composition roller 21 mounted for counterclockwise rotation adjacent the roller 17 on a shaft 22. The portion 23 of the coating layer 15 not transferred to the roller 21 is retained on the surface of the roller 17 to merge with the coating layer 14 in the area of proximity of the rollers 12 and 17. Adjacent the roller 17 and the coating layer 23 thereon is mounted a beta gauge generally designated 25, the function and operation of which will be described more fully hereinafter.

Vertically spaced from the composition roller 21 is a pick-up or scrapper roller 27 mounted for clockwise rotation on a shaft 28. A confined space or bite exists between the applicator roller 21 and pick-up roller 27.

By means of feed dogs 30 carried on an endless chain 31, which is driven by a sprocket 32 mounted on a shaft 33 driven from a suitable source of power (not shown), a sheet S to be coated is fed into the bite between the rollers 21, 27 and onto a horizontally disposed table 34. As the sheet S progresses through the bite between the rollers 21, 27, the portion 20 of the wet coating is applied to the surface thereof. Each of the shafts 13, 18, 22, and 28 is rotated in synchronism by a suitable source of power (not shown). As the coating layer 20 is applied to the surface of the sheet S as it passes through the bite of the rollers 21, 27, the sheet S is propelled by the rotation of these rollers along the table 34 (toward the right as viewed in FIG. 1) and out of the coating machine for subsequent disposition, such as passage through an oven for drying the coating layer 20 on the sheet S.

As disclosed in the aforementioned co-pending application, the beta gauge 25 contains a radioactive source 35 from which emanates a stream of beta rays 36 (FIGS. 1 and 2). Preferred as the radioactive source 35 is a medium or high energy source such as strontium 90-yttrium 90, thallium 204, or cesium 137. However, it is to be understood that any beta radiation source may be used, depending upon the type and composition of the coating being measured and the order or magnitude of its thickness. Also, a radiation source having a reasonably long life should be used, so that rapid loss in energy and consequent frequent recalibration thereof are obviated. A radioactive source having a life of at least two years is preferred. In view of these considerations and its ready availability, strontium 90-yttrium 90 is especially preferred. The beta gauge 25 is so mounted that the beta particles 36 are directed toward and through the film 23 and into the chromium layer 16. A portion 37 of the beta particles is reflected or backscattered from the chromium layer 16 and coating film 23 and is collected in an ionization chamber 38 contained in the beta gauge 25. The ionization chamber 38 is shielded from direct relation from the source 35. The collected backscattered beta rays 37 generate a small current in the ionization chamber 38, which varies directly with the quantity thereof, which in turn varies inversely with the thickness of the coating film 23. By means of suitable electric circuits obvious to one skilled in the art, the generated current is passed from the ionization chamber 38 through a suitable current amplifier 39 to a visual inspection device such as a meter 40 and/or to suitable electro-mechanical device to automatically adjust the metering rolls so as to control coating thickness. Since the beta radiation and backscattering is a random but statistically measurable quantity, rapid but relatively minor fluctuations will occur on the visual inspection device or meter 40. All other variables being constant, these fluctuations average to a substantially fixed value over a period of time, the longer the time, the more accurate the average. An averaging time of at least 7 seconds and preferably about 15 seconds has been found to give accurate results. This means that values given on the meter 40 at any one instant are without significance, and that for proper reading of the meter 40, it must be viewed continuously for a necessary period of time, e.g. 15 seconds, to ascertain the average value or mid-point of the fluctuations. This average value indicates the amount of coating being applied to the sheets passing through the roller coating machine. The actual amount or thickness of the coating 20 being applied to the sheet S may be obtained by comparing the readings on the meter 40 with a previously established plot of meter readings versus coating thickness; or the meter 40 may be calibrated directly in coating amounts.

The distance radioactive source 35 is spaced from the surface of film 23, is critical and depends upon the radioactive source used. The holder for the radioactive source 35 is constructed with suitably disposed shielding to permit radiation of beta particles in a direction angularly away from the face or opening of the ionization chamber 38 and is mounted a fixed distance in front of the ionization chamber. The face or opening of the chamber 38 points in the direction of the radiation but is shielded from direct radiation. As the radioactive source 35 and chamber 38 are moved in unison toward film 23, starting from a relatively far distance away, e.g. 6 inches or more, the intensity or quantity of backscattered radiation collected in the ionization chamber 38 will increase sharply until a distance between film 23 and radioactive source 35 is reached where many of the beta rays are backscattered into the source instead of into the ionization chamber. Thereafter, as the source 35 and chamber 38 continue to move toward film 23, the quantity of back scattered beta rays collected in the ionization chamber 38 will decrease rapidly. The optimum spacing of radiation source 35 from film 23 is that distance where the quantity of backscattered beta rays collected in the chamber 38 is at a maximum, so that slight variations in the spacing will not greatly affect the quantity of backscattered radiation collected in the chamber 38. This distance can be readily determined by those skilled in the art for any particular radioactive source used. Using strontium 90-yttrium 90 as the source of beta rays in the preferred or exemplary embodiment of the instant invention, the optimum spacing is about 5/8 inch, plus or minus 1/32 inch.

As indicated previously, the novelty of the instant invention resides in the non-magnetic metal surface 16 of the transfer roller 17. The entire transfer roller 17 may be composed of a non-magnetic metal; or a layer of non-magnetic metal may be applied to the surface of a steel roller. Because of its lower cost and desirable structural qualities, it is preferred that the roller 17 be composed of steel with a layer of non-magnetic metal applied to the outer surface thereof. This layer of non-magnetic metal may be applied in any suitable manner, such as by electroplating. Whether the roller 17 is composed entirely of non-magnetic metal or has a layer thereof on its outer surface, it is essential that the surface of the roller 17 be machined relatively smooth and as close to cylindrical as is physically possible. If the surface of the roller 17 is not truly cylindrical or substantially so, variations in the distance between the radioactive source 35 and the roller 17 will occur, with consequent inaccuracy in coating determination. For the same reasons, the roller 17 must be mounted so that there is no eccentricity in its rotation.

The roller 17, due to its substantial diameter, presents infinite thickness to penetration by the impinging beta rays 36. Therefore, if the roller is composed entirely of non-magnetic metal, infinite thickness of this metal is automatically provided. If, however, as is preferred, a layer of non-magnetic metal is adhered to the surface of a steel roller, this layer must be sufficiently thick to present infinite thickness to the impinging beta particles 36. What constitutes infinite thickness in any given case will depend upon the emitted beta particles and upon the nature of the non-magnetic metal layer. For example, in the case of strontium 90-yttrium 90, the minimum thickness of a plated, hard chromium layer that would represent infinite thickness is taken to be approximately 0.008 inch. If a higher energy radiation source were used, such as thallium 204, this minimum thickness would be greater. Further, as the density of the non-magnetic metal increases, the minimum thickness thereof, which is infinite with respect to beta particle penetration, decreases. However, whatever non-magnetic metal is used, a thickness thereof substantially greater, i.e. 1.5 to 2 times minimum thickness which is infinite with respect to beta particle penetration, would be applied to the steel substrate. The reason for this is to enable dressing of the non-magnetic metallic surface initially and the re-dressing thereof periodically after wearing to bring the surface back to its necessary smooth, cylindrical shape without the necessity of recoating the substrate each time. The non-magnetic metal layer 16 also must be applied sufficiently thick to allow for a minimum residual non-magnetic surface when the roller 17 has been reduced to its minimum usable diameter. For example, using strontium 90-yttrium 90 as the radiation source, a steel transfer roller having a layer 0.0135 in. thick of hard, plated chromium has performed satisfactorily.

The use of chromium has been emphasized hereinbefore as the non-magnetic surface metal for the roller 17. This metal is preferred, since it affords the absolutely essential non-magnetic property, and due to its hardness, i.e. Brinell hardness number of approximately 850 to 950, is very wear resistant. Further, this metal is relatively inexpensive and easily applied to the steel substrate of the roller 17. However, it must be understood that other non-magnetic materials may also be used in the instant invention if there are no special circumstances making their use prohibitive, such as cost, softness, etc. Among such other operable, non-magnetic metals may be mentioned nickel, silver, and copper.

The present invention is designed primarily for measuring the thickness or amount of an organic coating being applied to the sheet S. However, the invention is also applicable to measuring the thickness or amount of any wet film being applied to the sheet S provided that the atomic number of the atoms essentially composing the film 23 differs substantially from the atomic number of the atoms essentially composing the non-metallic layer 16 on the roller 17. For example, organic coatings are measurable by the invention since they consist essentially of atoms of carbon, atomic number 6, and hydrogen, atomic number 1, each of which differs substantially from the atomic number of chromium, 24. However, molten tin, atomic number 50, may also be applied in the manner previously described, since its atomic number also differs substantially from that of chromium.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An apparatus for measuring the amount of coating being applied to a moving flat surface comprising, coating means for applying a wet coating to said surface, at least a portion of said coating means being substantially cylindrical and having on the surface thereof a thin film of said wet coating, the surface of said cylindrical portion in contact with said thin film being composed of a non-magnetic metal, the atoms essentially composing said non-magnetic metal having an atomic number substantially different from the atoms essentially composing said thin film, means for moving said flat surface and said coating means relative to each other, radiation means adjacent said non-magnetic metal and said thin film and remote from said flat surface for directing a stream of beta rays against and through said thin film, said thin film presenting a finite thickness to penetration by said beta rays and said non-magnetic metal presenting an infinite thickness to penetration by said beta rays, detector means for detecting a quantity of beta rays backscattered from said non-magnetic metal and said thin film, said quantity being proportional to the amount of coating being applied to said flat surface, and visual inspection means coupled with said detector means for visually indicating said quantity.

2. The apparatus set forth in claim 1 wherein said non-magnetic metal is chromium.

3. The apparatus set forth in claim 1 wherein said non-magnetic metal is a layer of chromium at least 0.008 inch thick.

4. The apparatus set forth in claim 1 wherein said radiation means is strontium 90-yttrium 90.

5. An apparatus for measuring the amount of wet coating being applied to a moving flat surface comprising, means for advancing said flat surface along a predetermined path of travel, applicator means adjacent said path of travel for applying said coating to said flat surface, substantially cylindrical means associated with said applicator means for transporting a quantity of said wet coating to said applicator means whereby said cylindrical means has a thin film of said wet coating on its cylindrical surface, said cylindrical surface being composed of non-magnetic metal, the atoms essentially composing said non-magnetic metal having an atomic number substantially different from the atoms essentially composing said wet coating, radiation means adjacent said non-magnetic metal and said thin film thereon and remote from said flat surface for directing a stream of beta-rays against and through said thin film, said thin film presenting a finite thickness to penetration by said beta-rays and said non-magnetic metal presenting an infinite thickness to penetration by said beta-rays, detector means for detecing a quantity of beta-rays back-scattered from said non-magnetic metal and said thin film thereon, said quantity being proportional to the amount of coating being applied to said flat surface, and visual inspection means coupled with said detector means for visually indicating said quantity.

6. An apparatus for measuring the amount of a coating being applied to a moving flat surface comprising coating means for applying a wet coating to said surface including a cylindrical element having an inner core of magnetic metal and an outer covering of non-magnetic metal, said nonmagnetic metal providing the cylindrical surface of said element, said cylindrical surface carrying a thin film of said wet coating, the atoms essentially composing said non-magnetic metal having an atomic number substantially different from the atoms essentially composing said wet coating, means for moving said flat surface and said coating means relative to each other, radiation means adjacent said non-magnetic metal and said thin film thereon and remote from said flat surface for directing a stream of beta-rays against and through said thin film, said thin film presenting a finite thickness to penetration by said beta-rays and said non-magnetic metal presenting an infinite thickness to penetration by said beta-rays, detector means for detecting a quantity of beta-rays backscattered from said non-magnetic metal and said thin film thereon, said quantity being proportional to the amount of coating being applied to said flat surface, and visual inspection means coupled with said detector means for visually indicating said quantity.

7. An apparatus for measuring the amount of a wet coating being applied to a moving flat surface comprising means for advancing said surface along a predetermined path of travel, substantially cylindrical applicator means adjacent said path of travel for applying said coating to said flat surface, substantially cylindrical transfer means contiguous said applicator means for transporting a quantity of said wet coating to said applicator means, said transfer means being composed of an inner core of magnetic metal and an outer substantially cylindrical covering of a non-magnetic metal, the cylindrical surface of said non-magnetic metal having a thin film of said wet coating thereon, said nonmagnetic metal being essentially composed of atoms having an atomic number substantially different from the atoms essentially composing said thin film, a beta-ray emitting radioactive source adjacent said transfer means and said thin film thereon and remote from said flat surface for directing a stream of beta-rays against and through said thin film and against but not through said non-magnetic metal, detector means disposed on the side of said source opposite said transfer means for detecting a quantity of beta-rays back-scattered from said non-magnetic metal and said thin film thereon, said quantity of back-scattered beta-rays being proportional to the amount of coating being applied to said flat surface, and visual inspection means coupled with said detector means for visually indicating said quantity.

References Cited in the file of this patent

UNITED STATES PATENTS

| | | |
|---|---|---|
| 2,623,495 | Johnson | Dec. 30, 1952 |
| 2,711,480 | Friedman | June 21, 1955 |
| 2,897,371 | Hasler | July 28, 1959 |
| 2,943,202 | Kramer | June 28, 1960 |
| 2,964,631 | Foster | Dec. 13, 1960 |
| 2,967,934 | Martinelli | Jan. 10, 1961 |
| 2,988,641 | Gough | June 13, 1961 |

OTHER REFERENCES

Hayes: Continuous Measurement of Zinc Coatings Applied in a Continuous Coating Process, presented at the 31st Meeting of the Galvanizers Committee, sponsored by the American Zinc Institute, Inc., St. Louis, Mo., Apr. 24, 1954.